United States Patent
San Martin et al.

(10) Patent No.: US 10,359,535 B2
(45) Date of Patent: Jul. 23, 2019

(54) ELECTRODE-BASED TOOL MEASUREMENT CORRECTIONS BASED ON MEASURED LEAKAGE CURRENTS

(71) Applicant: HALLIBURTON ENERGY SERVICES, INC., Houston, TX (US)

(72) Inventors: Luis Emilio San Martin, Houston, TX (US); Ahmed E. Fouda, Spring, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/510,540

(22) PCT Filed: Oct. 9, 2015

(86) PCT No.: PCT/US2015/054983
§ 371 (c)(1),
(2) Date: Mar. 10, 2017

(87) PCT Pub. No.: WO2016/057948
PCT Pub. Date: Apr. 14, 2016

(65) Prior Publication Data
US 2017/0248730 A1    Aug. 31, 2017

Related U.S. Application Data

(60) Provisional application No. 62/062,726, filed on Oct. 10, 2014.

(51) Int. Cl.
*G01V 3/24* (2006.01)
*E21B 47/12* (2012.01)
(Continued)

(52) U.S. Cl.
CPC ............... *G01V 3/24* (2013.01); *E21B 47/12* (2013.01); *E21B 49/00* (2013.01); *E21B 49/087* (2013.01)

(58) Field of Classification Search
CPC .. G01V 3/38; G01V 3/24; E21B 47/12; E21B 49/00; E21B 49/087
(Continued)

(56) References Cited

U.S. PATENT DOCUMENTS 4,625,173 A * 11/1986 Wisler .................. G01V 3/082
                                                    324/347
6,351,129 B1    2/2002 Gounot
(Continued)

FOREIGN PATENT DOCUMENTS

WO    2012/067599    5/2012
WO    2012/067817    5/2012
(Continued)

OTHER PUBLICATIONS

PCT International Search Report and Written Opinion, dated Dec. 21, 2015, "Electrode-Based Tool Measurement Corrections Based on Measured Leakage Currents," Appln. No. PCT/US2015/054983, filed Oct. 9, 2015, 13 pgs.
(Continued)

*Primary Examiner* — Patrick Assouad
*Assistant Examiner* — Haidong Zhang
(74) *Attorney, Agent, or Firm* — Benjamin Fite; C. Tumey Law Group PLLC

(57) ABSTRACT

An example system includes an electrode-based tool for deployment in a downhole environment, where the electrode-based tool having a plurality of current electrodes, at least one voltage monitoring electrode, at least one return electrode. The electrode-based tool also includes electronics to measure leakage current between at least one of the
(Continued)

plurality of current electrodes and the at least one return electrode as current from at least one of the plurality of current electrodes is injected into the downhole environment and flows to the at least one return electrode. The system also includes at least one processor configured to derive a corrected downhole environment parameter based at least in part on the measured leakage current.

18 Claims, 7 Drawing Sheets

(51) Int. Cl.
  *E21B 49/00* (2006.01)
  *E21B 49/08* (2006.01)

(58) Field of Classification Search
  USPC .......................................... 324/356–357, 360
  See application file for complete search history.

(56) References Cited

U.S. PATENT DOCUMENTS

| | | | | |
|---|---|---|---|---|
| 6,359,438 | B1 | 3/2002 | Bittar | |
| 6,927,578 | B2* | 8/2005 | Homan | G01V 3/28 324/339 |
| 2003/0173968 | A1 | 9/2003 | Cheung et al. | |
| 2005/0179437 | A1 | 8/2005 | Hayman et al. | |
| 2005/0206385 | A1 | 9/2005 | Strack et al. | |
| 2007/0279063 | A1* | 12/2007 | Beard | G01V 3/24 324/355 |
| 2008/0252255 | A1 | 10/2008 | Hu et al. | |
| 2009/0177404 | A1* | 7/2009 | Hartmann | E21B 47/00 702/9 |
| 2012/0326723 | A1* | 12/2012 | Bloemenkamp | G01V 3/24 324/356 |
| 2013/0234718 | A1 | 9/2013 | Li et al. | |
| 2013/0257436 | A1* | 10/2013 | Bittar | G01V 3/24 324/355 |
| 2013/0297214 | A1* | 11/2013 | Reiderman | G01V 3/12 702/7 |
| 2014/0184229 | A1* | 7/2014 | Bloemenkamp | G01V 3/20 324/369 |

FOREIGN PATENT DOCUMENTS

| | | |
|---|---|---|
| WO | 2012/174317 | 12/2012 |
| WO | 2016/057946 | 4/2016 |

OTHER PUBLICATIONS

PCT International Search Report and Written Opinion, dated Dec. 17, 2015, "Electrode-Based Tool Measurements Corrections Based on Measured Leakage Currents Estimated Using a Predetermined Internal Impedance Model or Table," Appln. No. PCT/US2015/054980, filed Oct. 9, 2015, 11 pgs.

David P. Shattuck et al., "Scale Modelling of the Laterolog Using Synthetic Focusing Methods," The Log Analyst. V. 28, No. 04, 1967.

Klaus Cozzouno et al., "Synthetic Focusing and Simulation of Dual Laterolog Tool in Axisymmetric Subsurface Models," Journal of Applied Geophysics, 2007, V. 61, N. 2, p. 102-110.

J.W. Smits et al., "Improved Resistivity Interpretation Utilizing a New Array Laterolog Tool and Associated Inversion Processing," SPE 49328, Prepared for presentation at the 1998 Annual Technical Conference and Exhibition, Sep. 27-30, 1998, New Orleans, Louisiana.

* cited by examiner

ELECTRODE-BASED TOOL MEASUREMENT CORRECTIONS BASED ON MEASURED LEAKAGE CURRENTS

CROSS-REFERENCE TO RELATED APPLICATION

This application claims priority to Provisional U.S. Application Ser. No. 62/062,726, titled "Methods and Systems for Analysis of Electrode-Based Tool Measurements Using Measured Leakage Currents" and filed Oct. 10, 2014 by Luis Emilio San Martin, Ahmed E. Fouda and Burkay Donderici, which is incorporated herein by reference.

BACKGROUND

Modern oil field operators demand access to a great quantity of information regarding the parameters and conditions encountered downhole. Such information typically includes characteristics of the earth formations traversed by the borehole and data relating to the size and configuration of the borehole itself. The collection of information relating to conditions downhole, which commonly is referred to as "logging," can be performed by several methods including wireline logging and "logging while drilling" (LWD).

In wireline logging, a sonde is lowered into the borehole after some or all of the well has been drilled. The sonde hangs at the end of a long wireline cable that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated, thereby enabling measurements of the formation while it is less affected by fluid invasion. While LWD measurements are desirable, drilling operations create an environment that is generally hostile to electronic instrumentation, telemetry, and sensor operations.

Among the available wireline and LWD tools are a variety of electrode-based tools to evaluate electromagnetic properties of a formation. For example, electrode-based tool measurements are often used in the oil and gas industry to evaluate formation resistivity. Example tools of this type are laterolog and laterolog array tools. Obtaining an electrode-based tool measurement may, for example, involve placing electrodes in contact with the formation. Some electrodes inject current into the formation, while other electrodes measure voltages generated by the flow of current. The equations that relate voltages and currents for electrode-based tool measurements can be written as a linear system of equations of the form V=IR. Often assumptions are made to simplify the processing/interpretation of electrode-based measurements. An example assumption may be that there is an infinite input impedance internal to the tool between active or inactive excitation electrodes and a return electrode. Such assumptions may decrease the accuracy of electromagnetic formation properties derived from electrode-based tool measurements.

DESCRIPTION OF THE DRAWINGS

Accordingly, there are disclosed herein electrode-based tool measurement corrections based on measured leakage currents. In the figures.

Figure 1:
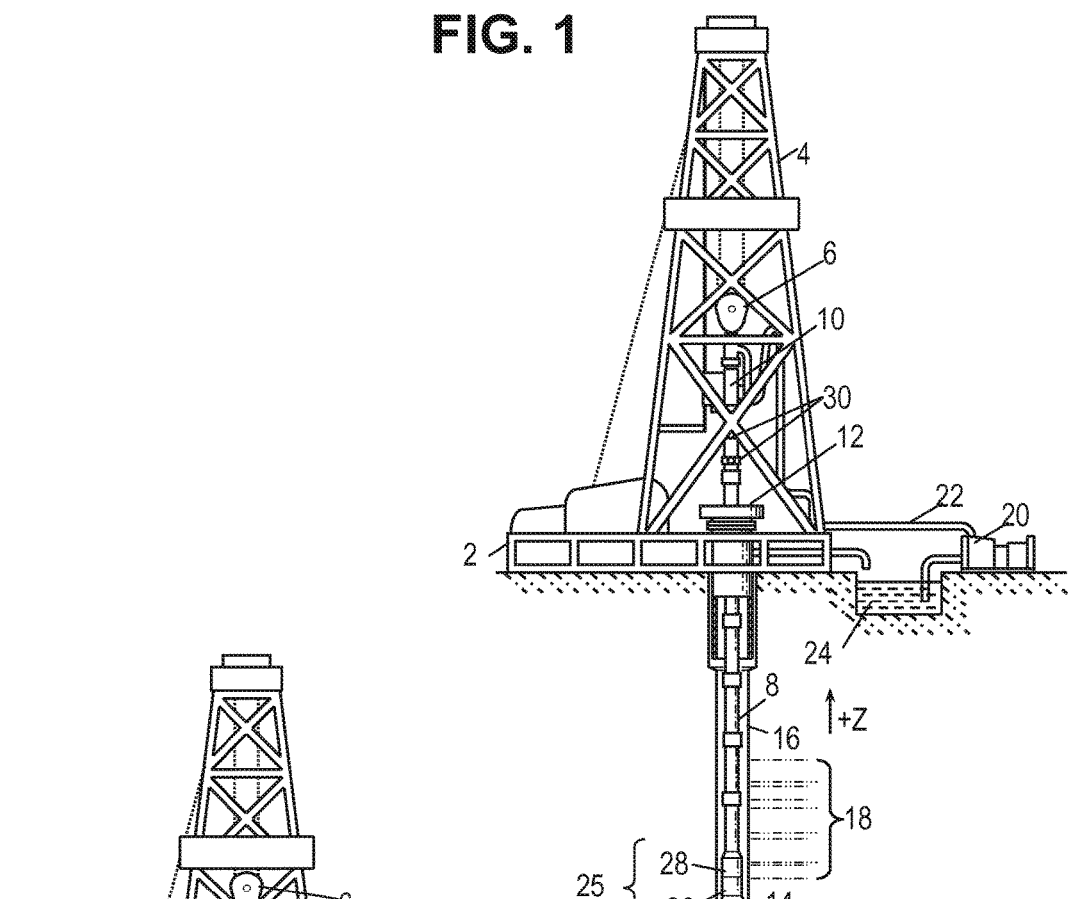
FIG. 1 is a schematic diagram showing an illustrative logging while drilling ("LWD") environment.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

Disclosed herein are methods and systems related to electrode-based tool measurement corrections based on measured leakage currents. The measured leakage currents may be obtained, for example, by one or more current meters integrated with the electrode-based tool. Example current meters include resistor-based meters and toroid-based meters. Such meters can be positioned at or near predetermined leakage current targets of the electrode-based tool. As needed, measured leakage currents may be adjusted based on a distance-to-target criteria and/or other criteria. Before or after adjustment, measured leakage currents may be used, for example, to correct electrode-based tool measurements or derived values such as apparent resistivities, dielectric properties, and/or distance to anomaly values. As an example, measured leakage currents may be applied to modified focusing mode equations that estimate apparent resistivity at one or more depths of investigation. Accounting for leakage currents as described herein improves the accuracy of derived electromagnetic properties compared to ignoring leakage currents or otherwise assuming such leakage currents are negligible.

In at least some embodiments, an example system includes an electrode-based tool for deployment in a downhole environment, where the electrode-based tool having a plurality of current electrodes, at least one voltage monitoring electrode, at least one return electrode. The electrode-based tool also includes electronics to measure leakage current between at least one of the plurality of current electrodes and the at least one return electrode as current from at least one of the plurality of current electrodes is injected into the downhole environment and flows to the at least one return electrode. The system also includes at least one processor configured to derive a corrected downhole environment parameter based at least in part on the measured leakage current.

Meanwhile, an example method includes deploying the electrode-based tool in a downhole environment. The method also includes measuring a leakage current between at least one of the plurality of current electrodes and at least one return electrode of the electrode-based tool. The method also includes deriving a corrected downhole environment parameter based at least in part on the measured leakage current. The method also includes storing or displaying the corrected downhole environment parameter.

The disclosed systems and methods are best understood in an application context. Turning now to the figures, FIG. 1 shows an illustrative logging while drilling (LWD) environment. A drilling platform 2 is equipped with a derrick 4 that supports a hoist 6 for raising and lowering a drill string 8. The hoist 6 suspends a top drive 10 suitable for rotating the drill string 8 and lowering the drill string through the well head 12. Connected to the lower end of the drill string 8 is a drill bit 14. As bit 14 rotates, it creates a borehole 16 that passes through various formations 18. A pump 20 circulates drilling fluid through a supply pipe 22 to top drive 10, down through the interior of drill string 8, through orifices in drill bit 14, back to the surface via the annulus around drill string 8, and into a retention pit 24. The drilling fluid transports cuttings from the borehole into the pit 24 and aids in maintaining the integrity of the borehole 16. Various materials can be used for drilling fluid, including a salt-water based conductive mud.

A LWD tool suite 26 is integrated into the bottom-hole assembly (BHA) 25 near the bit 14. As the bit extends the borehole through the formations, logging tool 26 collects measurements relating to various formation properties as well as the tool orientation and various other drilling conditions. The LWD tools 26 may take the form of a drill collar, i.e., a thick-walled tubular that provides weight and rigidity to aid the drilling process. (For the present discussion, the set of logging tools is expected to include an electrode-based tool such as a multi-array laterolog resistivity tool to measure formation resistivity.) A telemetry sub 28 may be included to transfer images and measurement data to a surface receiver 30 and to receive commands from the surface. In some embodiments, the telemetry sub 28 does not communicate with the surface, but rather stores logging data for later retrieval at the surface when the logging assembly is recovered.

Figure 2:
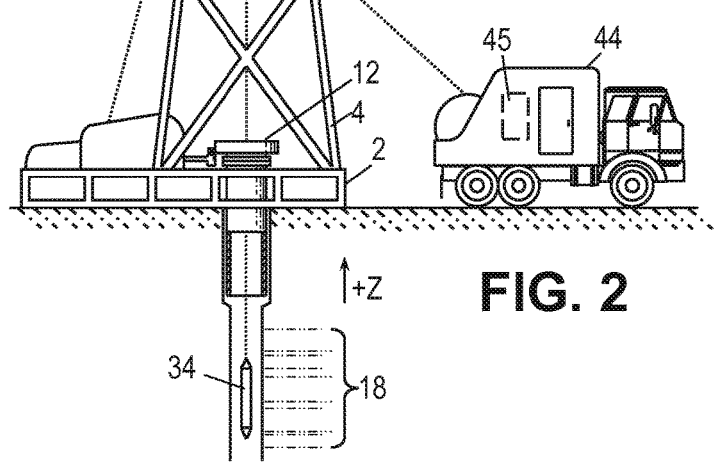
FIG. 2 is a schematic diagram showing an illustrative wireline logging environment.

At various times during the drilling process, the drill string 8 may be removed from the borehole as shown in FIG. 2. Once the drill string has been removed, logging operations can be conducted using a wireline logging sonde 34, i.e., a probe suspended by a cable 42 having conductors for transporting power to the sonde and telemetry from the sonde 34 to the surface. The wireline logging sonde 34 may have pads and/or centralizing springs to maintain tools near the axis of the borehole as the tool is pulled uphole. The wireline logging sonde 34 can include a variety of sensors including an electrode-based tool such as a multi-array laterolog tool for measuring formation resistivity. A logging facility 44 collects measurements from the logging sonde 34, and includes a computer system 45 for processing and storing the measurements gathered by the sensors.

Figure 3:
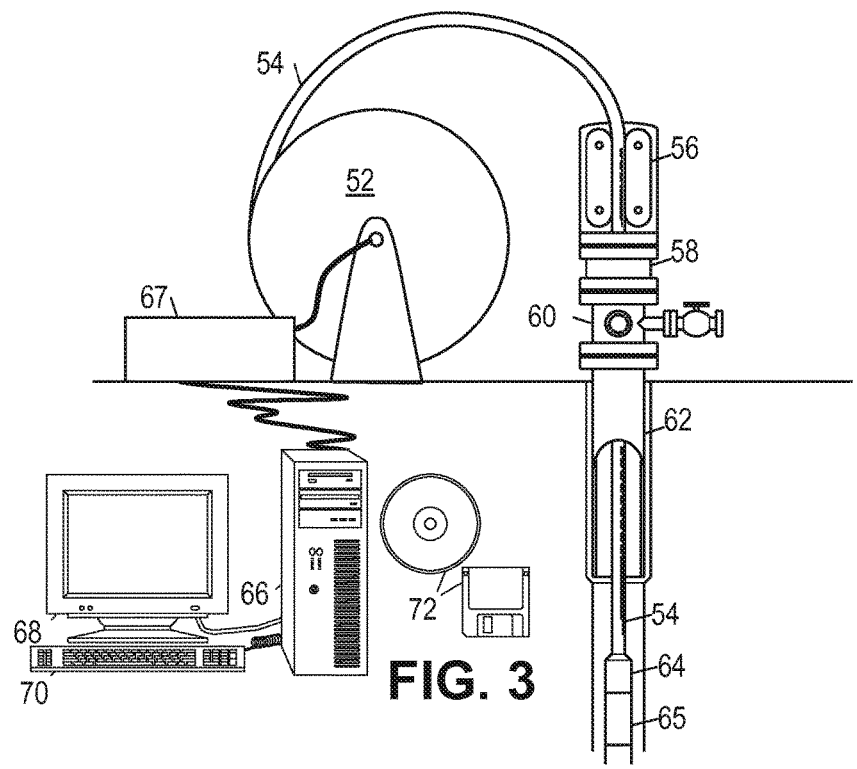
FIG. 3 is a schematic diagram showing an illustrative tubing-conveyed logging environment.

An alternative logging technique is tubing-conveyed logging. FIG. 3 shows an illustrative coil tubing logging system in which coil tubing 54 is pulled from a spool 52 by a tubing injector 56 and injected into a well through a packer 58 and a blowout preventer 60 into the well 62. In the well 62, a supervisory sub 64 and one or more logging tools 65 are coupled to the coil tubing 54 and configured to communicate to a surface computer system 66 via information conduits or other telemetry channels. The logging tools 365 can include a variety of sensors including an electrode-based tool such as a multi-array laterolog tool for measuring formation resistivity. An uphole interface 67 may be provided to exchange communications with the supervisory sub and receive data to be conveyed to the surface computer system 66.

Surface computer system 66 is configured to communicate with supervisory sub 64 to set logging parameters and collect logging information from the one or more logging tools 65 such as a multi-array laterolog tool. Surface computer system 66 includes a processing unit 67 configured to execute software (shown in FIG. 3 in the form of removable storage media 72) to monitor and/or direct the supervisory sub 64 and any logging tools 65. In at least some embodiments, the system 66 includes a display device 68 and a user-input device 70 to enable a human operator to interact with the system control software 72. Slickline or coiled tubing are other alternatives for conveying an electrode-based tool.

In each of the foregoing logging environments, the logging tool assemblies may include a navigational sensor package having directional sensors for determining the inclination angle, the horizontal angle, and the rotational angle (a.k.a. "tool face angle") of the BHA 25, wireline logging sonde 34, or logging tools 65. As is commonly defined in the art, the inclination angle is the deviation from vertically downward, the horizontal angle is the angle in a horizontal plane from true North, and the tool face angle is the orientation (rotational about the tool axis) angle from the high side of the wellbore. In accordance with known techniques, directional measurements can be made as follows: a three axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the BHA 25, wireline logging sonde 34, or logging tools 65 can be determined. Additionally, a three axis magnetometer measures the earth's magnetic field vector in a similar manner. From the combined magnetometer and accelerometer data, the horizontal angle of the BHA 25, wireline logging sonde 34, or logging tools 65 may be determined.

Figure 4:
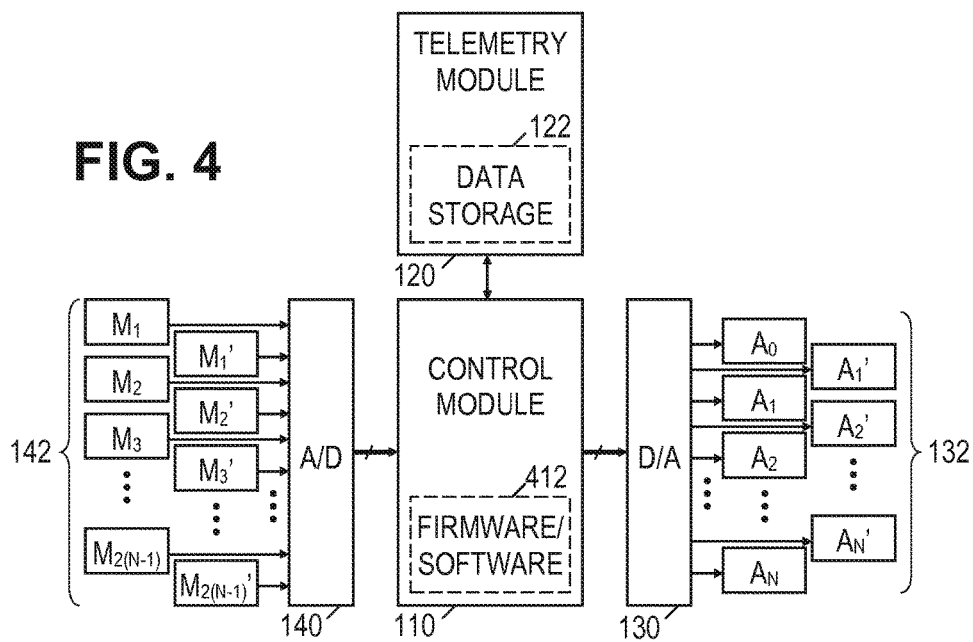
FIG. 4 is a schematic diagram showing a block diagram of an illustrative multi-array laterolog tool.

A discussion of multi-array laterolog tool electronics is in order before describing example constructions of the tool. FIG. 4 shows a functional block diagram of the tool electronics. The control module 110 governs the operation of the tool in accordance with software and/or firmware 112 stored in internal memory. The control module 110 couples to telemetry module 120 to receive commands and to provide measurement data. Control module 110 further connects to digital-to-analog converter 130 to drive current electrodes 132, and connects to analog-to-digital converter 140 to make voltage measurements via voltage monitoring electrodes 142. Control module 110 can be, for example, a general purpose processor, a digital signal processor, a programmable gate array, or an application specific integrated circuit. Telemetry module 120 receives and stores measurement data in a nonvolatile memory 122, and further operates as a communications interface between the control module 110 and the telemetry communications mechanism.

FIG. 4 shows 2N+1 current electrodes (electrodes $A_0$, $A_1$, $A_2$, ... $A_N$, $A_1'$, $A_2'$, ... $A_N'$) being independently driven via digital-to-analog converter 130. In some tool embodiments, the current electrodes are electrically connected in pairs, i.e., electrode $A_1$ is connected to electrode $A_1'$ by an electrical conductor, electrode $A_2$ is connected to electrode $A_2'$, etc. Moreover, the return electrodes are electrically connected (i.e., electrode $A_N$ is conductively coupled to electrode $A_N'$). In such alternative embodiments, the digital-to-analog converter can be simplified to drive only one electrode in each pair. Similarly, the voltage monitoring electrodes 142 can be electrically connected in pairs, i.e., with electrode $M_1$ connected to $M_1'$, electrode $M_2$ connected to $M_2'$, etc. It is also contemplated that each electrode can be individually driven/sensed and that the control module can collect the pair-wise measurements by appropriately combining the individual electrode currents and voltages.

Figure 5A:
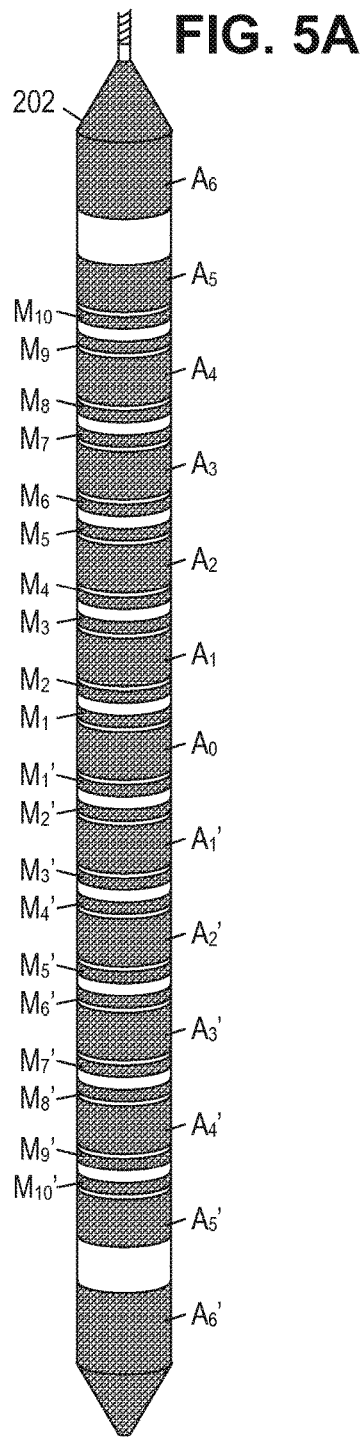
FIG. 5 is a diagram showing an illustrative multi-array laterolog tool.

FIG. 5A shows an illustrative multi-array laterolog tool 202 having (for the sake of illustration) equally-spaced current electrodes and return electrodes (electrodes $A_0$, $A_1$, $A_2$, ... $A_6$, $A_1'$, $A_2'$, ... $A_6'$), with interspersed voltage monitoring electrodes $M_1$-$M_{10}$ and $M_1'$-$M_{10}'$ on a wireline tool body. (It is desirable to separate the voltage monitoring electrodes from the current electrodes because the current electrodes often develop an impedance layer that distorts voltage measurements when current is flowing.) In practice, the electrodes are not equally sized and spaced. Better performance is achieved by having the more distant electrode increase in size. In FIG. 5A, the various electrodes are represented as being axially-spaced along the multi-array laterolog tool 202.

Figure 5B:
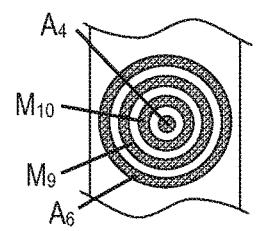
Figure 5C:
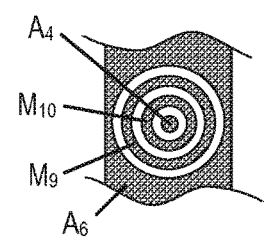
Figure 5C:
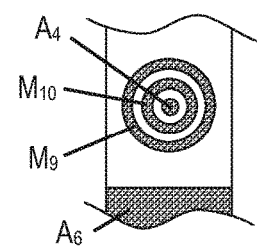

In contrast, FIGS. 5B-5D show alternative electrode configurations, where at least some of the electrodes represented are concentric relative to each other. For example, in FIG. 5B, the current electrode $A_4$ is shown to be concentric to and within voltage monitoring electrode $M_{10}$. Further, the voltage monitoring electrode $M_{10}$ is shown to be concentric to and within voltage monitoring electrode $M_9$. Further, the voltage monitoring electrode $M_9$ is shown to be concentric to and within return electrode $A_6$. The configuration of FIG. 5C is the same as FIG. 5B, except that the return electrode $A_6$ is shown to correspond to a section of the tool body surrounding the set of concentric electrodes. Meanwhile, in FIG. 5D, the return electrode $A_6$ is shown to be separated from the set of concentric electrodes by a section of the tool body. In different embodiments, combinations of axially-spaced electrodes and/or concentrically-spaced electrodes are possible.

Figure 6:
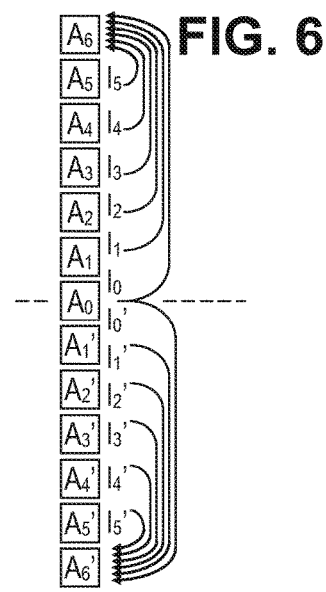
FIG. 6 is a schematic diagram showing an illustrative current flow pattern for a laterolog tool with various current electrodes.

Regardless of the particular electrode configuration, the tool electronics employ current electrodes to provide currents (e.g., $I_0$-$I_5$ and $I_0'$-$I_5'$). FIG. 6 is a schematic diagram showing an illustrative current flow pattern for a laterolog tool with the electrode configuration of FIG. 5A. As shown, currents $I_0$-$I_5$ are sourced from electrodes $A_0$-$A_5$ respectively, with electrode $A_6$ serving as a common return electrode for each of these currents. Similarly, currents $I0'$-$I5'$ are sourced from electrodes $A_0$ and $A_1'$-$A_5'$ respectively, with electrode $A_6'$ also serving as a common return electrode for the currents. If the current and voltage monitoring electrodes are pair-wise connected as discussed before, the tool cannot distinguish currents $I_0$-$I_5$ from $I_0'$-$I_5'$, but instead operates on the combined currents ($I_0+I_0'$, $I_1+I_1'$, $I_2+I_2'$, ... ). Otherwise, the tool can analyze currents $I_0$-$I_5$ separately from $I_0'$-$I_5'$, or in the alternative, combine the currents and voltages digitally before analyzing. Due to the symmetry of the array, only the top half is illustrated in the ensuing figures. Though not shown, the bottom half is presumed to be present.

To enable the voltage monitoring electrodes to distinguish the effects of the various currents, the currents are given distinguishable features. For example, the electrodes may be pair-wise connected and currents $I_0$-$I_5$ have distinguishable signal frequencies $f_0$-$f_5$. Alternatively, the currents could be distinguished through the use of time division multiplexing, code division multiplexing, or other methods that enable the currents to be independently monitored.

While each of the currents is provided with a characteristic that makes its effects distinguishable from those of the other currents, in at least some tool embodiments some of the currents are given common features. For example, some tool embodiments provide current $I_0$ with frequencies $f_0$ and $f_1$. The sharing of frequency $f_1$ by both current $I_0$ and $I_1$ enables straightforward hardware focusing.

As the tool drives current from the current electrodes, the currents pass through the borehole fluid and the formation to reach the return electrodes, creating a field potential indicative of the resistivity of the materials along the various current flow paths. The control module 110 records a voltage signal from each of the voltage monitoring electrodes 142 to measure the field potential at the voltage monitoring electrode locations. A frequency analysis of the voltage signals (e.g., by Fourier transform, filtering, or least-squares curve fitting) separates out those voltage signal components attributable to each of the currents.

With the measurements for the current flow pattern of FIG. 6, it becomes possible to derive the measurements associated with various current flow patterns. For more information regarding measurement analysis options for a laterolog tool, reference may be had to WO 2012/067599, entitled "Multi-array Laterolog Tools and Methods", and to WO 2012/067817, entitled "Multi-array Laterolog Tools and Methods with Differential Voltage Measurements."

In the different modes of operation of an array laterolog tool (e.g., the tool represented in FIGS. 4-6), different current flows are established between current electrodes, and voltages are measured at the voltage monitoring electrodes. For example, if a mode of operation corresponds to a current flowing between current electrodes $A_0$ and $A_6$ through the formation, the current should flow only between these two electrodes and it should not enter into another current electrode and from there reach the current return. In ideal tools the impedance internal through the tool between any of the current electrodes different from $A_6$ and the point of current return should be infinite, but in real tools this condition can only be approximated. Thus, in real tools there is always some current that enters the other current electrodes and from there reaches the current return. The same is true for the voltage electrodes, but for simplification the disclosed methods and systems are directed to leakage current related to non-ideal current electrodes.

Figure 7A:
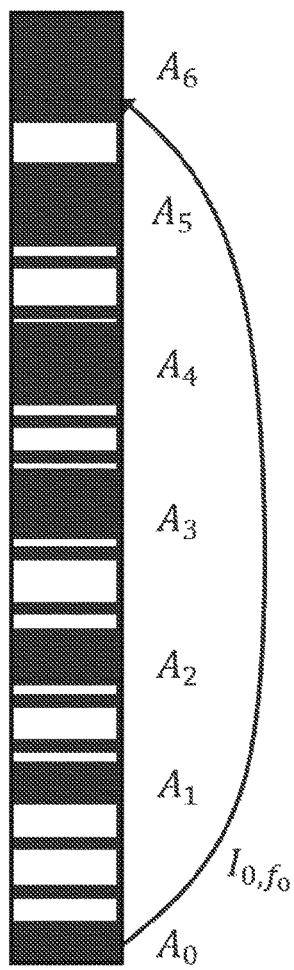
FIG. 7A is a schematic diagram showing a current flow pattern between electrodes of a laterolog tool without internal leakage currents.
Figure 7B:
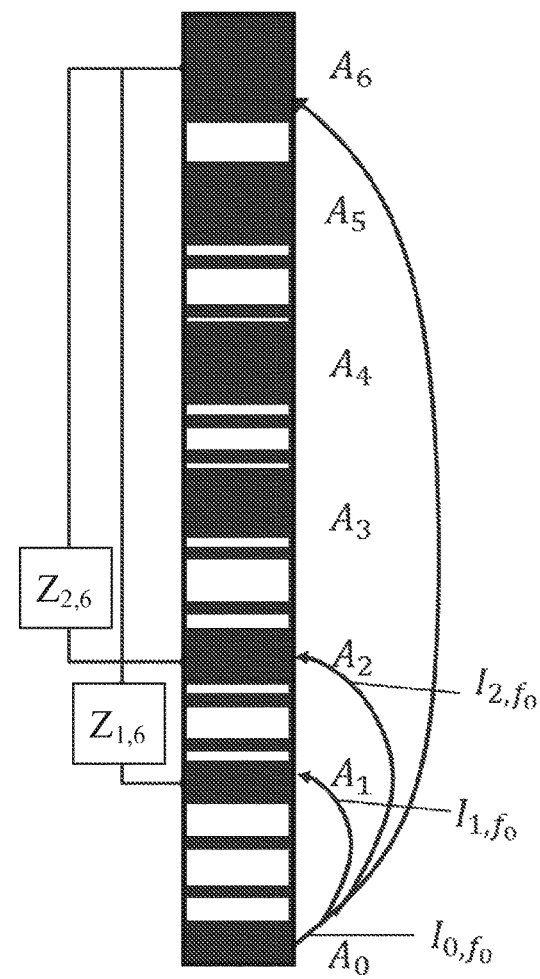
FIG. 7B is a schematic diagram showing a current flow pattern between electrodes of a laterolog tool with internal leakage currents.

The difference between ideal and real tools is illustrated schematically in FIGS. 7A and 7B. More specifically, FIG. 7A shows a current flow pattern between electrodes $A_0$ and $A_6$ without internal leakage currents. Meanwhile, FIG. 7B shows a current flow pattern between electrodes $A_0$ and $A_6$ with internal leakage currents due to a non-infinite impedance between $A_1$ and $A_6$ (labeled $Z_{1,6}$) and due to a non-infinite impedance between $A_2$ and $A_6$ (labeled $Z_{2,6}$). To account for non-infinite internal impedances between the different electrodes and the current return for the different modes of operation of the tool, the equations that describe the relationship between currents and voltages can be modified. These modifications can be used to evaluate corrections to improve tool accuracy. As an example, the original linear system of equations may be modified into another higher dimensional linear system of equations that now includes all the couplings, not only those that are present in the ideal tool.

As an example, in software focusing methods, multiple modes of operation are run simultaneously at different frequencies, with each current electrode emitting current at a single frequency. The emitted current is measured for use in the focusing equations. In addition, the currents that flow into non-active current electrodes may be taken into account. In accordance with at least some embodiments, the currents that flow into non-active current electrodes correspond to measured leakage currents as described herein.

Without limitation to other uses of measured leakage currents, an example is now provided for applying measured leakage currents to modified equations for software focusing. The modified software focusing equations are as follows:

Modified Focused Mode 1:

$$\begin{bmatrix} \Delta V_{1,2,f_0} & \Delta V_{1,2,f_2} & \Delta V_{1,2,f_3} & \Delta V_{1,2,f_4} & \Delta V_{1,2,f_5} \\ \sum_{i=0}^{2} I_{i,f_0} & \sum_{i=0}^{2} I_{i,f_2} & \sum_{i=0}^{2} I_{i,f_3} & \sum_{i=0}^{2} I_{i,f_4} & \sum_{i=0}^{2} I_{i,f_5} \\ I_{3,f_0} & I_{3,f_2} & I_{3,f_3} & I_{3,f_4} & I_{3,f_5} \\ I_{4,f_0} & I_{4,f_2} & I_{4,f_3} & I_{4,f_4} & I_{4,f_5} \\ I_{5,f_0} & I_{5,f_2} & I_{5,f_3} & I_{5,f_4} & I_{5,f_5} \end{bmatrix} \begin{bmatrix} C_0 \\ C_2 \\ C_3 \\ C_4 \\ C_5 \end{bmatrix} = \begin{bmatrix} -\Delta V_{1,2,f_1} \\ -\sum_{i=0}^{2} I_{i,f_1} \\ -I_{3,f_1} \\ -I_{4,f_1} \\ -I_{5,f_1} \end{bmatrix}$$

$$V_1 = C_0 V_{1,f_0} + V_{1,f_1} + C_2 V_{1,f_2} + C_3 V_{1,f_3} + C_4 V_{1,f_4} + C_5 V_{1,f_5}$$

$$I_0 = C_0 I_{0,f_0} + I_{0,f_1} + C_2 I_{0,f_2} + C_3 I_{0,f_3} + C_4 I_{0,f_4} + C_5 I_{0,f_5}$$

$$R_{a_1} = k_1 \frac{V_1}{I_0}$$

For Modified Focused Mode 1, the frequencies $f_0, f_1, \ldots, f_5$ denote different current excitation patterns. For example, $f_0$ denotes injecting current from $A_0$ and returning to $A_6$, $f_1$ denotes injecting current from $A_1$ and returning to $A_6$, and so on. Excitations can be made simultaneously at different frequencies, or sequentially using one frequency or more. These are referred to as the unfocused modes. $V_{i,f_j}$ is the voltage of the $i^{th}$ voltage monitoring electrode, with respect to the reference, when the tool is excited with frequency $f_j$. $\Delta V_{1,2,f_j}$ is the potential difference between voltage monitoring electrodes 1 and 2 when the tool is excited with frequency $f_j$. $I_{i,f_j}$ is the current injected from electrode $A_i$ when the tool is excited with frequency $f_j$. The adopted sign convention is such that $I_{i,f_j}$ is positive if it is injected from the electrode into the formation; and negative if it is returning into the electrode. Further, $k_1$ is the tool constant of Modified Focused Mode 1. Other Modified Focused Modes can be expressed as follows:

Modified Focused Mode 2:

$$\begin{bmatrix} \Delta V_{1,2,f_0} & \Delta V_{1,2,f_2} & \Delta V_{1,2,f_3} & \Delta V_{1,2,f_4} & \Delta V_{1,2,f_5} \\ \Delta V_{3,4,f_0} & \Delta V_{3,4,f_2} & \Delta V_{3,4,f_3} & \Delta V_{3,4,f_4} & \Delta V_{3,4,f_5} \\ \sum_{i=0}^{3} I_{i,f_0} & \sum_{i=0}^{3} I_{i,f_2} & \sum_{i=0}^{3} I_{i,f_3} & \sum_{i=0}^{3} I_{i,f_4} & \sum_{i=0}^{3} I_{i,f_5} \\ I_{4,f_0} & I_{4,f_2} & I_{4,f_3} & I_{4,f_4} & I_{4,f_5} \\ I_{5,f_0} & I_{5,f_2} & I_{5,f_3} & I_{5,f_4} & I_{5,f_5} \end{bmatrix} \begin{bmatrix} C_0 \\ C_2 \\ C_3 \\ C_4 \\ C_5 \end{bmatrix} = \begin{bmatrix} -\Delta V_{1,2,f_1} \\ -\Delta V_{3,4,f_1} \\ -\sum_{i=0}^{3} I_{i,f_1} \\ -I_{4,f_1} \\ -I_{5,f_1} \end{bmatrix}$$

$$V_1 = C_0 V_{1,f_0} + V_{1,f_1} + C_2 V_{1,f_2} + C_3 V_{1,f_3} + C_4 V_{1,f_4} + C_5 V_{1,f_5}$$

$$I_0 = C_0 I_{0,f_0} + I_{0,f_1} + C_2 I_{0,f_2} + C_3 I_{0,f_3} + C_4 I_{0,f_4} + C_5 I_{0,f_5}$$

$$R_{a_2} = k_2 \frac{V_1}{I_0}$$

Modified Focused Mode 3:

$$\begin{bmatrix} \Delta V_{1,2,f_0} & \Delta V_{1,2,f_2} & \Delta V_{1,2,f_3} & \Delta V_{1,2,f_4} & \Delta V_{1,2,f_5} \\ \Delta V_{3,4,f_0} & \Delta V_{3,4,f_2} & \Delta V_{3,4,f_3} & \Delta V_{3,4,f_4} & \Delta V_{3,4,f_5} \\ \Delta V_{5,6,f_0} & \Delta V_{5,6,f_2} & \Delta V_{5,6,f_3} & \Delta V_{5,6,f_4} & \Delta V_{5,6,f_5} \\ \sum_{i=0}^{4} I_{i,f_0} & \sum_{i=0}^{4} I_{i,f_2} & \sum_{i=0}^{4} I_{i,f_3} & \sum_{i=0}^{4} I_{i,f_4} & \sum_{i=0}^{4} I_{i,f_5} \\ I_{5,f_0} & I_{5,f_2} & I_{5,f_3} & I_{5,f_4} & I_{5,f_5} \end{bmatrix} \begin{bmatrix} C_0 \\ C_2 \\ C_3 \\ C_4 \\ C_5 \end{bmatrix} = \begin{bmatrix} -\Delta V_{1,2,f_1} \\ -\Delta V_{3,4,f_1} \\ -\Delta V_{5,6,f_1} \\ -\sum_{i=0}^{4} I_{i,f_1} \\ -I_{5,f_1} \end{bmatrix}$$

$$V_1 = C_0 V_{1,f_0} + V_{1,f_1} + C_2 V_{1,f_2} + C_3 V_{1,f_3} + C_4 V_{1,f_4} + C_5 V_{1,f_5}$$

$$I_0 = C_0 I_{0,f_0} + I_{0,f_1} + C_2 I_{0,f_2} + C_3 I_{0,f_3} + C_4 I_{0,f_4} + C_5 I_{0,f_5}$$

$$R_{a_3} = k_3 \frac{V_1}{I_0}$$

Modified Focused Mode 4:

$$\begin{bmatrix} \Delta V_{1,2,f_0} & \Delta V_{1,2,f_2} & \Delta V_{1,2,f_3} & \Delta V_{1,2,f_4} & \Delta V_{1,2,f_5} \\ \Delta V_{3,4,f_0} & \Delta V_{3,4,f_2} & \Delta V_{3,4,f_3} & \Delta V_{3,4,f_4} & \Delta V_{3,4,f_5} \\ \Delta V_{5,6,f_0} & \Delta V_{5,6,f_2} & \Delta V_{5,6,f_3} & \Delta V_{5,6,f_4} & \Delta V_{5,6,f_5} \\ \Delta V_{7,8,f_0} & \Delta V_{7,8,f_2} & \Delta V_{7,8,f_3} & \Delta V_{7,8,f_4} & \Delta V_{7,8,f_5} \\ \sum_{i=0}^{5} I_{i,f_0} & \sum_{i=0}^{5} I_{i,f_2} & \sum_{i=0}^{5} I_{i,f_3} & \sum_{i=0}^{5} I_{i,f_4} & \sum_{i=0}^{5} I_{i,f_5} \end{bmatrix} \begin{bmatrix} C_0 \\ C_2 \\ C_3 \\ C_4 \\ C_5 \end{bmatrix} = \begin{bmatrix} -\Delta V_{1,2,f_1} \\ -\Delta V_{3,4,f_1} \\ -\Delta V_{5,6,f_1} \\ -\Delta V_{7,8,f_1} \\ -\sum_{i=0}^{5} I_{i,f_1} \end{bmatrix}$$

$$V_1 = C_0 V_{1,f_0} + V_{1,f_1} + C_2 V_{1,f_2} + C_3 V_{1,f_3} + C_4 V_{1,f_4} + C_5 V_{1,f_5}$$

$$I_0 = C_0 I_{0,f_0} + I_{0,f_1} + C_2 I_{0,f_2} + C_3 I_{0,f_3} + C_4 I_{0,f_4} + C_5 I_{0,f_5}$$

$$R_{a_4} = k_4 \frac{V_1}{I_0}$$

Modified Focused Mode 5:

$$\begin{bmatrix} \Delta V_{1,2,f_0} & \Delta V_{1,2,f_2} & \Delta V_{1,2,f_3} & \Delta V_{1,2,f_4} & \Delta V_{1,2,f_5} \\ \Delta V_{3,4,f_0} & \Delta V_{3,4,f_2} & \Delta V_{3,4,f_3} & \Delta V_{3,4,f_4} & \Delta V_{3,4,f_5} \\ \Delta V_{5,6,f_0} & \Delta V_{5,6,f_2} & \Delta V_{5,6,f_3} & \Delta V_{5,6,f_4} & \Delta V_{5,6,f_5} \\ \Delta V_{7,8,f_0} & \Delta V_{7,8,f_2} & \Delta V_{7,8,f_3} & \Delta V_{7,8,f_4} & \Delta V_{7,8,f_5} \\ \Delta V_{9,10,f_0} & \Delta V_{9,10,f_2} & \Delta V_{9,10,f_3} & \Delta V_{9,10,f_4} & \Delta V_{9,10,f_5} \end{bmatrix} \begin{bmatrix} C_0 \\ C_2 \\ C_3 \\ C_4 \\ C_5 \end{bmatrix} =$$

$$\begin{bmatrix} -\Delta V_{1,2,f_1} \\ -\Delta V_{3,4,f_1} \\ -\Delta V_{5,6,f_1} \\ -\Delta V_{7,8,f_1} \\ -\Delta V_{9,10,f_1} \end{bmatrix}$$

$$V_1 = C_0 V_{1,f_0} + V_{1,f_1} + C_2 V_{1,f_2} + C_3 V_{1,f_3} + C_4 V_{1,f_4} + C_5 V_{1,f_5}$$

$$I_0 = C_0 I_{0,f_0} + I_{0,f_1} + C_2 I_{0,f_2} + C_3 I_{0,f_3} + C_4 I_{0,f_4} + C_5 I_{0,f_5}$$

$$R_{a_5} = k_5 \frac{V_1}{I_0}$$

Accounting for leakage currents, as disclosed herein, results in the system of equations becoming larger. For the sake of comparison, the original equations for Focused Mode 1 are given as:

$$\begin{bmatrix} \Delta VM_{1,2,f0} & \Delta VM_{1,2,f2} \\ I_{0,f0} & I_{2,f2} \end{bmatrix} \begin{bmatrix} C_{1,1} \\ C_{1,2} \end{bmatrix} = \begin{bmatrix} -\Delta VM_{1,2,f1} \\ -I_{1,f1} \end{bmatrix}.$$

$$R_{a,1} = k_1 \frac{V_1}{I_0},$$

with $V_1 = V_{1,f_1} + C_{1,1} V_{1,f_2} + C_{1,2} V_{1,f_2}$, and $I_0 = C_{1,1} I_{0,f_0}$, and $k_1$ is the tool constant of the original Focused Mode 1.

Comparing the original and Modified Focused Mode 1 equations, it may be noted that in order to restore the focusing condition and hence obtain the same apparent resistivity of the ideal tool using a real tool, all unfocused modes (6 for the array laterolog tool considered here) need to be combined. The Modified Focused Mode 1 equations impose the same two conditions imposed by the original Focused Mode 1 equations, plus a zero total current is enforced at the isolated electrodes (i.e., those that are ideally not excited for this mode). If there is no current leakage through non-excited electrodes (ideal tool), the Modified Focused Mode 1 equations automatically reduce to original Focused Mode 1 equations.

It should be noted that the measurement of all currents can be also used as a diagnostic of the quality of the tool, because if currents that are supposed to be small become larger than the allowed tolerance, then the quality of the tool is degraded and action can be taken to improve it. Accordingly, measured leakage currents (in addition to adjusting/correcting electromagnetic properties derived for of a formation) may be used to assess the quality of an electrode-based tool continuously while in operation.

In accordance with at least some embodiments, measured leakage currents are obtained with little or no modifications to the electrode-based tool. For example, the measured leakage current for a given current electrode may be obtained using a current meter that is already provided to measure the current emitted from the given electrode. To account for leakage currents, the waveform collected by a current meter may be processed to extract information about each incoming current (distinguishable, for example, by its frequency). Example current meters include resistor-based meters and toroid-based meters. In a resistor-based meter scenario, a voltage drop is measured across a known resistor. The voltage across the resistor and the known resistor value are then used to calculate the current passing through the resistor (i.e., I=V/R). In a toroid-based meter scenario, a toroid is wrapped around a conductor/wire through which current is leaking. The voltage measured across the terminals of the toroid is proportional to the current flowing through the conductor/wire. Such meters can be positioned at or near predetermined leakage current targets of the electrode-based tool (e.g., at each current electrode or at select current electrodes).

Figure 8:
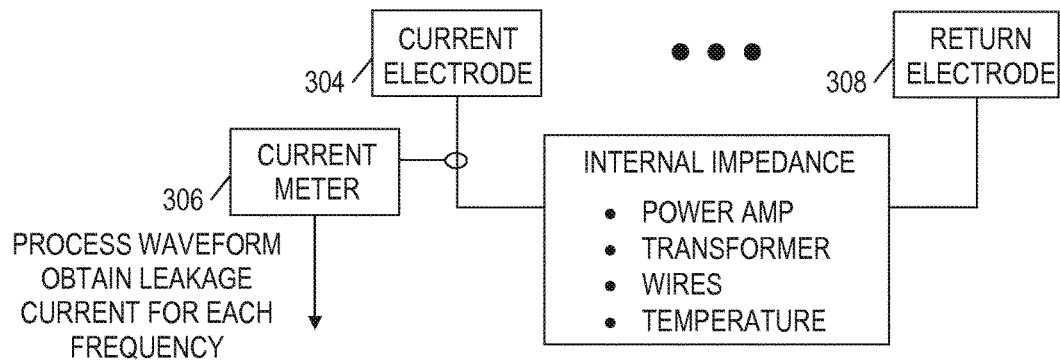
FIG. 8 is a block diagram showing some components of an electrode-based tool.

FIG. 8 is a block diagram showing some components of an electrode-based tool. In FIG. 8, a current electrode 304 (e.g., any of $A_1$-$A_5$ or $A_1'$-$A_5'$) and a return electrode 308 ($A_6$ or $A_6'$) are represented. Further, an internal impedance between the current electrode 304 and return electrode 308 are represented. Further, a current meter 306 for the current electrode 304 is represented. In at least some embodiments, the internal impedance between the represented current electrode 304 and return electrode 308 is a function of power amplifier characteristics, transformer characteristics, wires, and an ambient temperature. The power amplifier, the transformer, and/or other electronics contributing to the internal impedance between the represented current electrode 304 and return electrode 308 may be components mounted to a printed circuit board (PCB). Further, the wires may correspond to insulated wires or traces between the current electrode 304, a PCB, components mounted on a PCB, and return electrode 308. Regardless of the particular wiring and components contributing to leakage current between the represented current electrode 304 and the return electrode 308, the current meter 306 represented is able to obtain a waveform of all currents received by or output from the current electrode 304. As current output from the current electrode 304 has a particular frequency and currents input to the current electrode 304 have particular frequencies, the waveform collected by the current meter 306 can reveal information about leakage currents. It should be appreciated that a current meter 306 can be included for each current electrode of an electrode-based tool to measure both main current that flows out of the electrode and leakage currents that flow into the electrodes as described herein.

Figure 9:
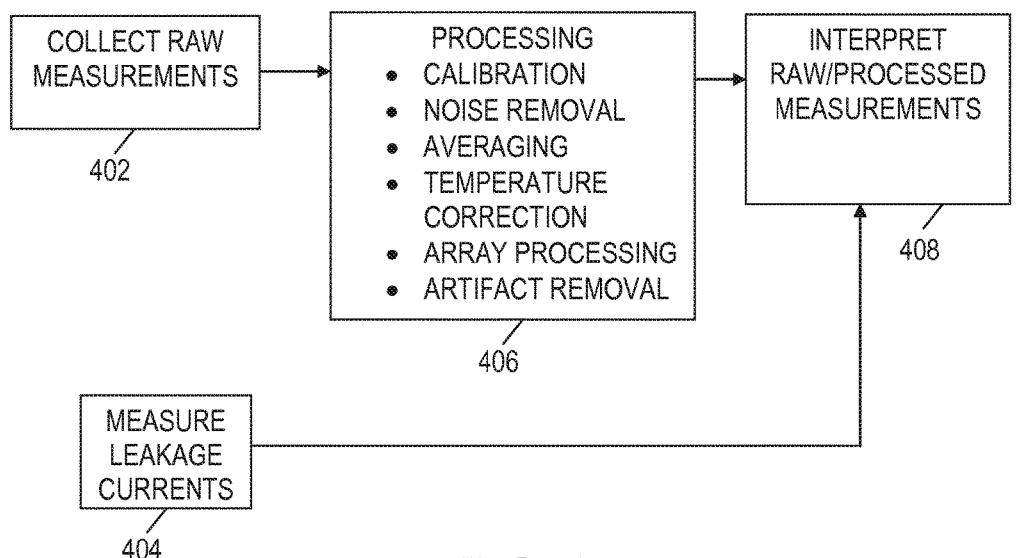
FIG. 9 is a block diagram showing illustrative processing options for measurements collected by an electrode-based tool.

FIG. 9 is a block diagram showing illustrative processing options for measurements collected by an electrode-based tool. At block 402, raw measurements for an electrode-based tool are collected. As an example, the raw measurements may correspond to voltage measurements collected by voltage monitoring electrodes as one or more current electrodes inject current into a formation. As the raw measurements are collected, corresponding leakage current measurements are also collected at block 404 as described herein. Various processing options for the raw measurements are represented at block 406 and include, for example, calibration operations, noise removal operations, averaging operations, temperature correction operations, array processing operations, and artifact removal operations. Some of the operations that can be applied on the acquired raw responses are as follows: filtering to reduce noise; calibration to known calibration experiment; array processing (software focusing) of the data to achieve different depth of detection or vertical/azimuthal resolution. All of these operations above are well-known in the field of EM well logging and their details will not be provided here. At block 408, the raw measurements and/or the processed measurements are interpreted based at least in part on the measured leakage currents.

One way to interpret raw measurements and/or processed measurements involves an inversion. Inversion schemes may, for example, convert the raw measurements and/or processed measurements to electromagnetic properties of a formation. A general description of the inversion scheme is as follows. First, a forward model is used to generate the tool response. Then the measured response is compared to signals from the forward model and an iterative numerical optimization problem is solved based on the difference between the two. A numerical model of the formation is constructed for forward modeling. A number of constraints consistent with the a priori knowledge of the formation can be used to single out the correct physical solution. After convergence of the inversion the solution for electromagnetic properties of the formation can be obtained. Example electromagnetic properties include apparent resistivity values and dielectric values. Further, distance to anomalies (e.g., a bed boundary, a nearby casing) can be calculated. By accounting for leakage current, the accuracy of the inversion process is improved. As mentioned herein, modified software focusing equations that are a function of measured leakage currents may be used.

Figure 10:
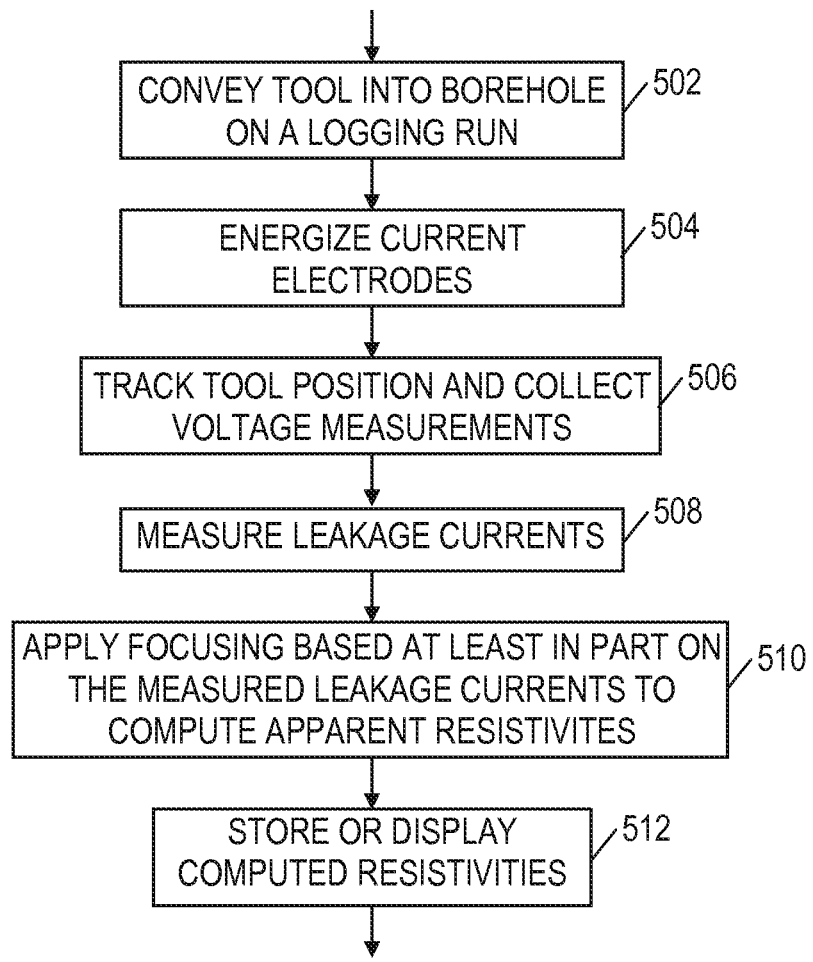
FIG. 10 is a flowchart showing an illustrative resistivity logging method employing a measured leakage current.
Figure 11:
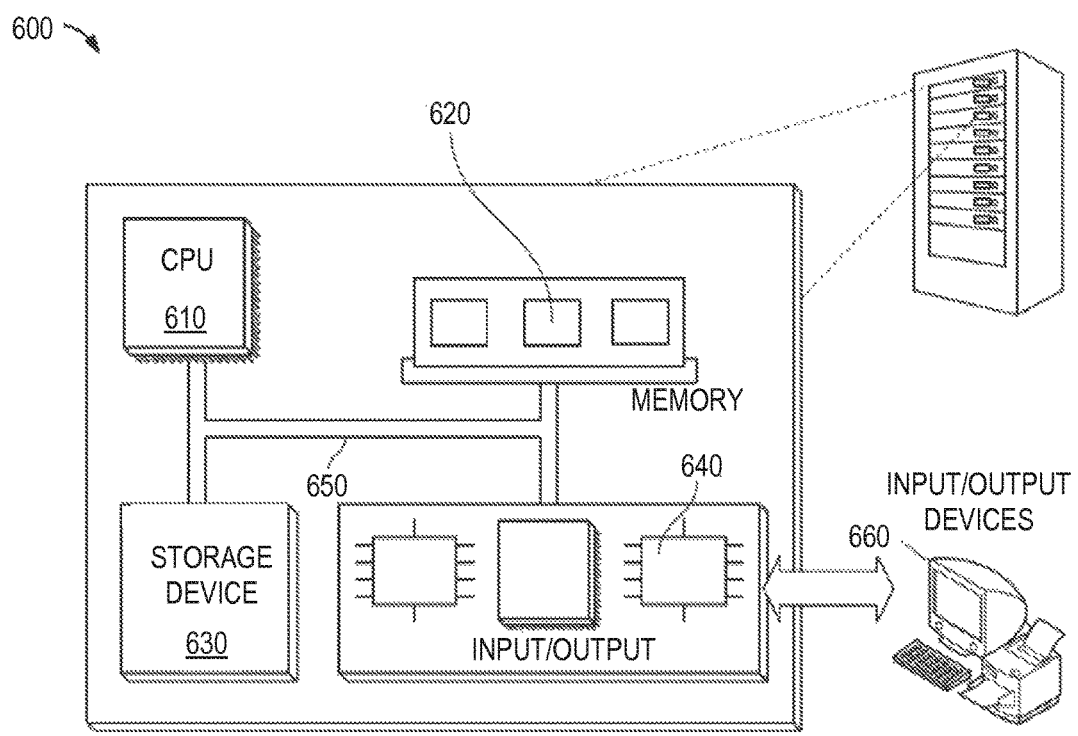
FIG. 11 is a diagram of an illustrative computer system.

FIG. 10 is a flowchart showing an illustrative resistivity logging method employing measured leakage currents. First, an electrode-based tool is conveyed into a borehole on a logging run at block 502. At each logging point downhole at least one current electrode is energized at block 504. For each logging point, tool position is tracked and voltages are collected by the voltage monitoring electrodes at block 506. Further, main currents and leakage currents are measured for each logging point at block 508. The voltages collected by the monitor voltage electrodes at block 506 and the measured currents collected at block 508 may be stored and/or communicated to earth's surface. At block 510, focusing based at least in part on the measured leakage currents is applied to compute apparent resistivities (e.g., see the equations for Modified Focused Modes 1-5). The computed resistivities are stored or displayed (e.g., in the form of a log) at block 512.

At least some of the disclosed methods and systems related to processing electrode-based tool measurements and accounting for leakage current involve digital electronic circuitry, or computer software, firmware, or hardware, including the structures disclosed in this specification and their structural equivalents, or in combinations of one or more of them. For example, some of the calculations described herein can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described herein can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit). As used herein, the term "configured to" as applied to processors (or other programmable components) refers to availability of executable software instructions, to firmware included with the processor, and/or to hardware or circuitry included with the processor to perform one or more operations or calculations (e.g., accessing measured leakage currents, applying the measured leakage currents, storing results, displaying results or related information/images).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

FIG. 14 shows an example computer system 600 that may be used to process measurements from electrode-based tools and account for leakage current based at least in part on an internal impedance model or table. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor, a multi-threaded processor, or another type of processor. The processor 610 is capable of processing instructions stored in the memory 620 or on the storage device 630. The memory 620 and the storage device 630 can store information within the system 600.

The input/output device 640 provides input/output operations for the system 600. In some implementations, the input/output device 640 can include one or more network interface devices, e.g., an Ethernet card; a serial communication device, e.g., an RS-232 port; and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 660. In some implementations, mobile computing devices, mobile communication devices, and other devices can be used.

The computer system 600 may, for example, receive voltage measurements, temperature measurements, and current measurements collected by an electrode-based tool, including leakage current measurements. The measured leakage currents can be applied to correct electrode-based tool measurements (e.g., a measured return current) or derived values such as apparent resistivities, dielectric properties, and/or distance to anomaly values. As an example, the computer system 600 may apply the measured leakage currents to modified focusing mode equations to estimate apparent resistivity at one or more depths of investigation. Accounting for leakage currents as described herein improves the accuracy of derived electromagnetic properties compared to ignoring leakage currents or otherwise assuming such leakage currents are negligible.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

Embodiments disclosed herein include:

A: A system that comprises an electrode-based tool for deployment in a downhole environment, the electrode-based tool having a plurality of current electrodes, at least one voltage monitoring electrode, and at least one return electrode. The electrode-based tool also comprises electronics to measure leakage current between at least one of the plurality of current electrodes and the at least one return electrode as current from at least one of the plurality of current electrodes is injected into the downhole environment and flows to the at least one return electrode. The system also comprises at least one processor configured to derive a corrected downhole environment parameter based at least in part on the measured leakage current.

B: A method that comprises deploying the electrode-based tool in a downhole environment. The method also comprises measuring a leakage current between at least one of the plurality of current electrodes and at least one return electrode of the electrode-based tool. The method also comprises deriving a corrected downhole environment parameter based at least in part on the measured leakage current. The method also comprises storing or displaying the corrected downhole environment parameter.

Each of the embodiments, A and B, may have one or more of the following additional elements in any combination. Element 1: wherein the electronics comprises a resistor-based meter to measure the leakage current. Element 2: wherein the electronics comprises a toroid-based meter to measure the leakage current. Element 3: wherein at least some of the plurality of current electrodes are axially-spaced along a tool body of the electrode-based tool. Element 4: wherein at least some of the plurality of current electrodes have a concentric arrangement relative to each other or relative to the at least one return electrode. Element 5: wherein the processor is configured to apply the measured leakage current to at least one focused mode calculation to calculate apparent resistivity of the downhole environment at one or more depths of investigation. Element 6: wherein the corrected downhole environment parameter comprises a distance between the electrode-based tool and a subsurface anomaly. Element 7: wherein the corrected downhole environment parameter comprises an electromagnetic property of the downhole environment. Element 8: wherein the processor is configured to calculate a quality factor for the downhole environment parameter based at least in part on the measured leakage current. Element 9: wherein the processor is configured to raise an alert if the measured leakage current is greater than a threshold value.

Element 10: wherein said measuring is performed by a resistor-based meter. Element 11: wherein said measuring is performed by a toroid-based meter. Element 12: wherein at least some of the plurality of current electrodes have a concentric arrangement relative to each other or relative to the at least one return electrode. Element 13: wherein the measured leakage current is applied to at least one focused mode calculation to calculate apparent resistivity of the downhole environment at one or more depths of investigation. Element 14: wherein the measured leakage current is applied to at least four focused mode calculations to calculate apparent resistivity of the downhole environment at different depths of investigation. Element 15: wherein said deploying involves a lowering the electrode-based tool using wireline, slickline, or coiled tubing. Element 16: wherein said deploying involves a lowering the electrode-based tool as part of a logging-while-drilling (LWD) assembly. Element 17: further comprising calculating a quality factor for the downhole environment parameter based at least in part on the measured leakage current. Element 18: further comprising raising an alert if the measured leakage current is greater than a threshold value.

Numerous other modifications, equivalents, and alternatives, will become apparent to those skilled in the art once the above disclosure is fully appreciated. Measuring and using leakage currents as described herein is valid for any impedance network that may be present in between electrodes of an electrode-based tool. Besides the array laterolog tool described herein, other tools that could benefit from measured leakage currents include, for example, dual laterolog tools, micro-resistivity logging tools, spherically focused logging tools, micro-spherically focused logging tools. Further, measured leakage currents may be applied to surface prospecting arrangements that employ electrodes to analyze surface-to-surface responses, surface-to-borehole responses, or borehole-to-borehole responses (e.g., cross-well applications). It is intended that the following claims be interpreted to embrace all such modifications, equivalents, and alternatives where applicable.

What is claimed is:

1. A system that comprises:
an electrode-based tool for deployment in a downhole environment, the electrode-based tool having:
a plurality of current electrodes;
at least one voltage monitoring electrode;
at least one return electrode; and
electronics to measure leakage current between at least one of the plurality of current electrodes and the at least one return electrode as current from at least one of the plurality of current electrodes is injected into the downhole environment and flows to the at least one return electrode; and
at least one processor configured to derive a corrected downhole environment parameter based at least in part on the measured leakage current, wherein the processor is configured to apply the measured leakage current to at least one focused mode calculation to calculate apparent resistivity of the downhole environment at one or more depths of investigation as the corrected downhole environment parameter, wherein the at least one focused mode calculation has been modified from an original linear set of equations to a higher dimensional set of equations to account for the measured leakage current.

2. The system of claim 1, wherein the electronics comprises a resistor-based meter to measure the leakage current.

3. The system of claim 1, wherein the electronics comprises a toroid-based meter to measure the leakage current.

4. The system of claim 1, wherein at least some of the plurality of current electrodes are axially-spaced along a tool body of the electrode-based tool.

5. The system of claim 1, wherein at least some of the plurality of current electrodes have a concentric arrangement relative to each other or relative to the at least one return electrode.

6. The system of claim 1, wherein the corrected downhole environment parameter further comprises a distance between the electrode-based tool and a subsurface anomaly.

7. The system of claim 1, wherein the corrected downhole environment parameter further comprises an electromagnetic property of the downhole environment.

8. The system of claim 1, wherein the processor is configured to calculate a quality factor for the downhole environment parameter based at least in part on the measured leakage current.

9. The system of claim 1, wherein the processor is configured to raise an alert if the measured leakage current is greater than a threshold value.

10. A method that comprises:
deploying the electrode-based tool in a downhole environment;
measuring a leakage current between at least one of the plurality of current electrodes and at least one return electrode of the electrode-based tool;
deriving a corrected downhole environment parameter based at least in part on the measured leakage current, wherein the measured leakage current is applied to at least one focused mode calculation to calculate apparent resistivity of the downhole environment at one or more depths of investigation as the corrected downhole environment parameter, wherein the at least one focused mode calculation has been modified from an original linear set of equations to a higher dimensional set of equations to account for the measured leakage current; and
storing or displaying the corrected downhole environment parameter.

11. The method of claim 10, wherein said measuring is performed by a resistor-based meter.

12. The method of claim 10, wherein said measuring is performed by a toroid-based meter.

13. The method of claim 10, wherein at least some of the plurality of current electrodes have a concentric arrangement relative to each other or relative to the at least one return electrode.

14. The method of claim 10, wherein the measured leakage current is applied to at least four focused mode calculations to calculate apparent resistivity of the downhole environment at different depths of investigation.

15. The method of claim 10, wherein said deploying involves a lowering the electrode-based tool using wireline, slickline, or coiled tubing.

16. The method of claim 10, wherein said deploying involves a lowering the electrode-based tool as part of a logging-while-drilling (LWD) assembly.

17. The method of claim 10, further comprising calculating a quality factor for the downhole environment parameter based at least in part on the measured leakage current.

18. The method of claim 10, further comprising raising an alert if the measured leakage current is greater than a threshold value.

* * * * *